US011417343B2

(12) United States Patent
Cohen et al.

(10) Patent No.: US 11,417,343 B2
(45) Date of Patent: Aug. 16, 2022

(54) AUTOMATIC SPEAKER IDENTIFICATION IN CALLS USING MULTIPLE SPEAKER-IDENTIFICATION PARAMETERS

(71) Applicant: ZoomInfo Converse LLC, Vancouver, WA (US)

(72) Inventors: Raphael Cohen, Beer Sheva (IL); Erez Volk, Rehovot (IL); Russell Levy, Raanana (IL); Micha Yochanan Breakstone, Raanana (IL); Orgad Keller, Tel Aviv (IL); Ilana Tuil, Tel Aviv (IL); Amit Ashkenazi, Rehovot (IL)

(73) Assignee: ZOOMINFO CONVERSE LLC, Vancouver, WA (US)

( * ) Notice: Subject to any disclaimer, the term of this patent is extended or adjusted under 35 U.S.C. 154(b) by 0 days.

(21) Appl. No.: 16/025,306

(22) Filed: Jul. 2, 2018

(65) Prior Publication Data
US 2018/0342251 A1 Nov. 29, 2018

Related U.S. Application Data

(63) Continuation-in-part of application No. 15/604,513, filed on May 24, 2017, now Pat. No. 10,637,898.

(51) Int. Cl.
G10L 17/00 (2013.01)
G10L 17/20 (2013.01)
(Continued)

(52) U.S. Cl.
CPC .............. *G10L 17/20* (2013.01); *G06F 16/58* (2019.01); *G06F 16/784* (2019.01);
(Continued)

(58) Field of Classification Search
None
See application file for complete search history.

(56) References Cited

U.S. PATENT DOCUMENTS 5,659,662 A 8/1997 Wilcox et al.
6,424,946 B1 * 7/2002 Tritschler ............ G06F 17/3074
704/251

(Continued)

OTHER PUBLICATIONS

U.S. Appl. No. 15/604,513 by Cohen, R., et al., filed May 24, 2017.

*Primary Examiner* — Richard Z Zhu
(74) *Attorney, Agent, or Firm* — Summit Patents PC

(57) ABSTRACT

A speaker identification system ("system") automatically assigns a speaker to voiced segments in a call. The system identifies one or more speakers in a call using one or more speaker-identification parameters. The system processes the call to determine one or more speaker-identification parameters, such as a transcript of the call, a facial image of the speaker, a scene image, which is an image of a scene in which the speaker is located during the call, or textual data associated with the call such as names of the speaker or an organization that are retrieved from the scene images or video data of the call. The system analyzes one or more of the speaker-identification parameters and determines the identity of the speaker. The system then identifies the voice segments associated with the identified speaker and marks the voice segments with the identity of the speaker.

24 Claims, 11 Drawing Sheets

(51) Int. Cl.
*H04M 3/42* (2006.01)
*G10L 13/08* (2013.01)
*G06F 16/58* (2019.01)
*G06F 16/783* (2019.01)
*G06V 40/70* (2022.01)
*G06V 40/16* (2022.01)
*G10L 17/02* (2013.01)

(52) U.S. Cl.
CPC ............ *G06V 40/172* (2022.01); *G06V 40/70* (2022.01); *G10L 13/08* (2013.01); *G10L 17/00* (2013.01); *H04M 3/42093* (2013.01); *H04M 3/42221* (2013.01); *G10L 17/02* (2013.01); *H04M 2201/41* (2013.01); *H04M 2203/303* (2013.01); *H04M 2203/6054* (2013.01)

(56) References Cited

U.S. PATENT DOCUMENTS

| | | | |
|---|---|---|---|
| 6,490,560 B1* | 12/2002 | Ramaswamy | G10L 17/10 704/231 |
| 6,748,356 B1 | 6/2004 | Beigi et al. | |
| 7,620,547 B2 | 11/2009 | Kompe et al. | |
| 7,739,114 B1 | 6/2010 | Chen et al. | |
| 7,937,269 B2 | 5/2011 | Aggarwal et al. | |
| 7,940,897 B2 | 5/2011 | Khor et al. | |
| 8,131,118 B1* | 3/2012 | Jing | G01C 21/20 382/305 |
| 8,515,025 B1 | 8/2013 | Hewinson | |
| 8,554,563 B2 | 10/2013 | Aronowitz | |
| 8,571,865 B1* | 10/2013 | Hewinson | G10L 17/06 704/236 |
| 8,612,224 B2* | 12/2013 | Breslin | G10L 17/00 704/243 |
| 8,983,836 B2* | 3/2015 | Woodward | G10L 15/22 704/231 |
| 9,058,806 B2* | 6/2015 | Sankar | G10L 17/02 |
| 9,462,102 B1* | 10/2016 | Gorthi | G10L 17/005 |
| 9,596,349 B1 | 3/2017 | Hernandez | |
| 9,785,891 B2 | 10/2017 | Agarwal et al. | |
| 9,860,282 B2* | 1/2018 | Farrell | G06Q 50/01 |
| 9,978,396 B2* | 5/2018 | Ekambaram | G10L 25/63 |
| 2003/0154072 A1* | 8/2003 | Young | G06F 17/30017 704/9 |
| 2008/0088698 A1* | 4/2008 | Patel | H04N 7/15 348/14.09 |
| 2010/0086108 A1* | 4/2010 | Jaiswal | G10L 17/005 379/88.04 |
| 2011/0217021 A1 | 9/2011 | Dubin et al. | |
| 2013/0006634 A1* | 1/2013 | Grokop | G10L 17/10 704/245 |
| 2013/0041947 A1* | 2/2013 | Sammon | H04L 12/1822 709/204 |
| 2014/0006026 A1* | 1/2014 | Lamb | G10L 17/00 704/246 |
| 2014/0025620 A1* | 1/2014 | Greenzeiger | G06F 17/30702 706/47 |
| 2014/0025707 A1* | 1/2014 | Sivaraman | G06F 17/30277 707/772 |
| 2014/0222428 A1 | 8/2014 | Cumani et al. | |
| 2014/0330566 A1* | 11/2014 | Redfern | G10L 17/005 704/246 |
| 2014/0337034 A1 | 11/2014 | John et al. | |
| 2015/0025887 A1* | 1/2015 | Sidi | G10L 17/04 704/245 |
| 2015/0088515 A1* | 3/2015 | Beaumont | G10L 17/06 704/251 |
| 2016/0275952 A1* | 9/2016 | Kashtan | G10L 17/22 |
| 2016/0364780 A1* | 12/2016 | Carbonell | G10L 15/197 |
| 2018/0082689 A1 | 3/2018 | Khoury et al. | |
| 2018/0204576 A1* | 7/2018 | Dhoot | H04N 7/152 |
| 2018/0211670 A1 | 7/2018 | Gorodetski et al. | |
| 2018/0254051 A1* | 9/2018 | Church | G10L 21/028 |
| 2018/0307675 A1* | 10/2018 | Akkiraju | G06N 20/00 |

* cited by examiner

AUTOMATIC SPEAKER IDENTIFICATION IN CALLS USING MULTIPLE SPEAKER-IDENTIFICATION PARAMETERS

CROSS-REFERENCE TO RELATED APPLICATION(S)

This application is a continuation-in-part of U.S. application Ser. No. 15/604,513 titled "AUTOMATIC SPEAKER IDENTIFICATION IN CALLS" filed May 24, 2017, which is incorporated herein by reference for all purposes in its entirety.

BACKGROUND

Automatic speech recognition techniques allow extracting business insights from telephone conversations with customers of an organization. This data allows improving sales and customer success, Customer Support, Marketing and Product functions (e.g., to understand and hear the "voice of the customer") by providing coaching to representatives of the organization, e.g., on desired behaviors, measuring compliance and generating data regarding market and product requirements automatically. Such data can also be used for determining best practices by identifying winning patterns, making sales process more efficient by summarizing calls so that the representatives can have less sync meetings, and for guiding conversations in real-time. Attributing utterances and words to the person who spoke them is useful for any downstream analysis such as search, call visualization, identifying buying cues, extracting customer pain points, identifying good/bad sales behaviors, and extracting notes and tasks.

When a call is recorded as a single channel (mono), or when multiple speakers are co-located in the same room, identifying the speaker requires applying various algorithmic techniques. Previous technologies aim to split the call between different speakers, an approach termed "diarization", e.g., determine that a particular voice is of "speaker 1," on the call; another voice is of "speaker 2" on the call, another voice is of "speaker 3" on the call, and so on. Such technologies may not identify those speakers. Some other technologies use multi-channel recordings in which each of the speakers in the conversation is on a separate communication channel and the speakers can be identified based on the channel assigned to the speaker. However, such technologies may not work in a single channel recording.

Some technologies may identify the speakers, but they need to record a short voice sample for creating a speaker fingerprint and use this speaker fingerprint to identify the speakers. However, this requires active participation of the recorded user which can hurt adoption rates and provide a non-smooth user experience.

DETAILED DESCRIPTION

Figure 1:
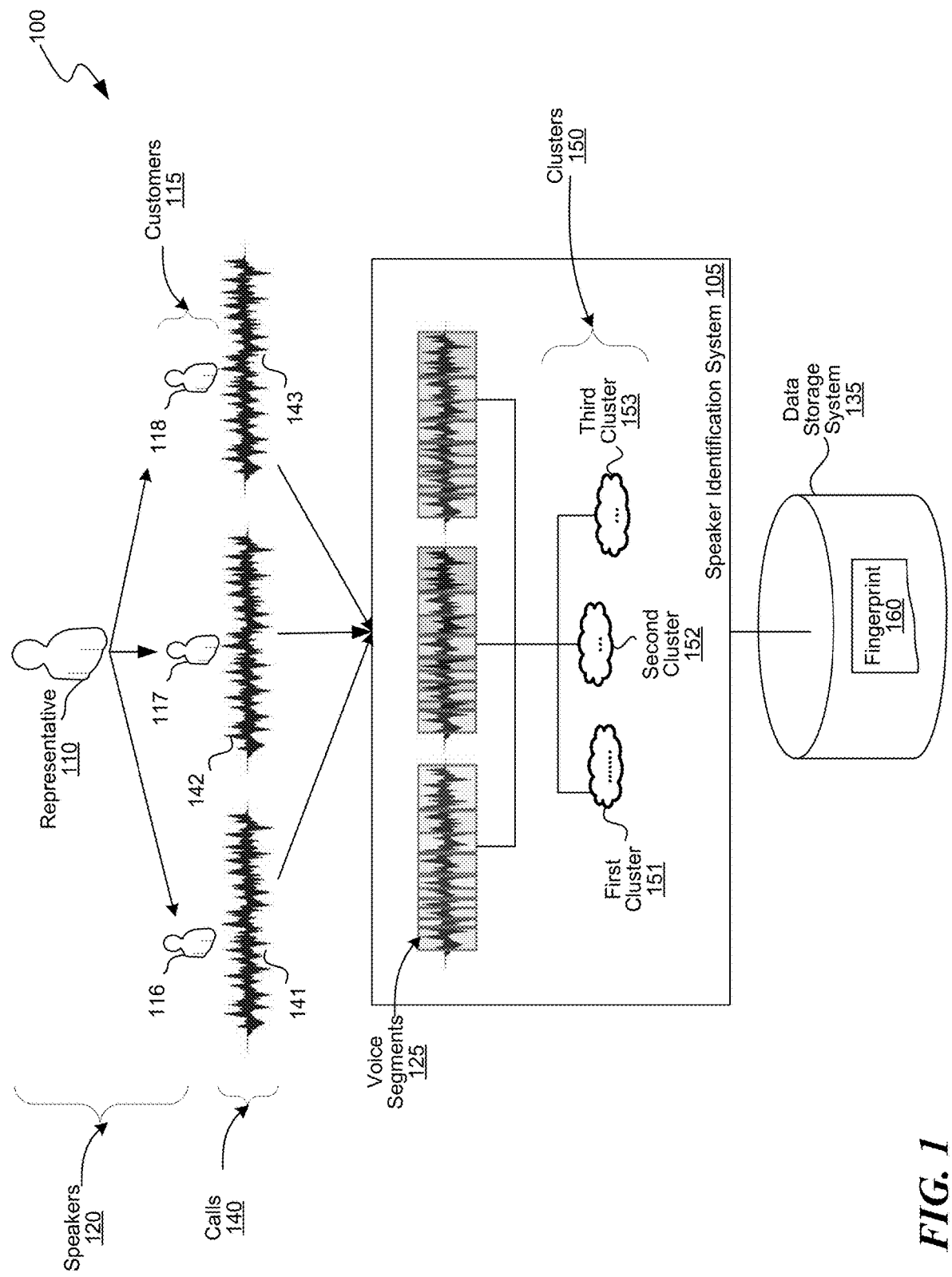
FIG. 1 is a block diagram of an environment in which the disclosed embodiments can be implemented.

Embodiments are directed to a speaker identification system for identifying a speaker in a conversation without requiring any voice sample or any other action from the speaker for identification purposes. The speaker identification system learns or generates a fingerprint of a speaker in an unsupervised manner, and uses such fingerprints for identifying a speaker in a particular conversation. The speaker identification system can generate fingerprints for and/or identify one or more speakers, e.g., employees or representatives of an organization, who take part in conversations with other speakers, e.g., customers of the organization. For example, to generate a fingerprint for a specified representative, the speaker identification system processes a number of calls the specified representative had with a number of customers to generate multiple voice segments for each of the calls, identifies the voice segments that satisfy a speaker identification criterion, e.g., voice segments having the same or a similar feature across all the calls, and determines the voice in the identified voice segments as the voice of the specified representative.

The feature can include at least one of a voice of the speaker, speech rate of the speaker, an accent of the speaker, linguistic attributes of the speaker, an ambient noise, a speech volume, a tone, a timber, emotions of the speaker (e.g., fear, anger, happiness, timidity, fatigue), personal attributes of the speaker (e.g., an age, an accent, and a gender), physical ailments of the speaker, physical conditions of the speaker, and level of education of the speaker.

The speaker identification system generates the fingerprint for the specified representative based on the identified voice segments, associates the fingerprint with the user ID of the specified representative, and stores the fingerprint in a data storage system. The data storage system can store fingerprints of multiple such speakers.

The speaker identification system can use the fingerprints from the data storage system to identify a representative in a conversation, such as a live or real-time conversation or a recording of a previous conversation. For example, consider that a representative is in conversation with a customer in a telephone call. The speaker identification system receives real-time conversation data, e.g., an audio stream of the telephone call, processes the audio stream to generate multiple voice segments and identifies groups of voice segments that have the same or a similar feature. A first group of voice segments can have the voice of a first speaker; a second group of voice segments can have the voice of a second speaker and so on. The speaker identification system then compares the groups of voice segments with the fingerprints from the data storage system to identify a matching fingerprint. If a matching fingerprint is found for a particular group of voice segments, the speaker identification system determines the representative in the real-time conversation as the representative corresponding to the user ID associated with the matching fingerprint. After the speaker identification system identifies the representative in the real-time conversation, the speaker identification system can identify the voice segments in the conversation in which the representative spoke, and mark those voice segments as having the voice of the identified representative.

The speaker identification system receives as input a call. In some embodiments, the calls can be associated with metadata, which can include information regarding identities of all or some speakers in the call. However, the information does not indicate which voice in the call belongs to which speaker. For example, for a call between a representative and one or more customers, the speaker identification system can receive as input the call and user identification (ID) of the representative. The metadata may optionally include some customer identification as well. In some embodiments, at least some portion of the metadata can be derived from video data of the call, e.g., visual data. In some embodiments, the calls are mono-channel, that is, the conversations are performed over a single communication channel.

Speaker identification can be used for various purposes. For example, in a customer care center scenario, the speaker identification can be used for analysis such as search, call visualization, identifying buying cues, extracting customer pain points, identifying good and/or bad sales behaviors, and extracting notes and tasks. As described above, the disclosed speaker identification system requires no voice print, user effort or explicit interaction by the user for identification purposes.

Note that a "call" is a recording of the conversation between two or more speakers and such conversations can be telephone based, Voice over Internet Protocol (VoIP) based, video conference based, Virtual Reality (VR) based, Augmented Reality (AR) based, or based on any online meetings, collaborations or interactions. The call can also be a recording of a conversation between the speakers physically located in the same room. Further, the call can also be a real-time data stream of a real-time interaction between the speakers. The real-time data stream can be an audio stream, a video stream, or both.

Embodiments are also disclosed for identifying any of the speakers in the call, e.g., a representative, a customer, or both. The embodiments automatically assign a speaker name to voiced segments in a call, using cues from multiple speaker-identification parameters in addition to or other than fingerprints. Identifying a speaker can include determining identification information of the speaker, which can include one or more of a name of the speaker, an ID of the speaker, an email ID of the speaker, an alias of the speaker, an organization with which the speaker is associated, etc. The embodiments can use speaker-identification parameters such as text, image and/or video related features from the call to identify a speaker. For example, the speaker identification system can generate a facial image of a speaker from the video portion of the call and analyze the facial image, e.g., compare the facial image with facial images of a set of users using facial image recognition, to identify the speaker. In another example, the speaker identification system can generate a transcript of the call and identify the speaker based on introduction information of the speaker in the call. In still another example, the speaker identification system can generate an image of a scene or a setting, e.g., an image of a room, a speaker is located at during the conversation, and analyze the image of the scene to identify the speaker. In yet another example, the speaker identification system can recognize any text, e.g., using optical character recognition (OCR), in a video of the call that can be used to identify the speaker. The speaker identification system can also use information from the metadata, e.g., email IDs, names, user IDs of the representative and/or customers, to identify the speaker.

Turning now to FIG. 1, FIG. 1 is a block diagram of an environment 100 in which the disclosed embodiments can be implemented. The environment 100 includes a speaker identification system 105 that facilitates unsupervised learning or generation of a speaker's fingerprint for identifying of a speaker in a conversation. The speaker identification system 105 analyzes a set of calls 140 to generate a fingerprint for one or more of the speakers 120 in the calls 140. The speakers 120 can include one or more speakers who are to be identified by the speaker identification system 105. For example, the speakers to be identified are representatives or employees of an organization such as a customer care center, who are in conversation with speakers who don't have to be identified, e.g., customers of the organization. The speaker identification system 105 can identify a representative in a particular conversation by analyzing one or more calls the representative has had with one or more customers.

The roles of the speaker to be identified and the speaker who need not be identified are not limited to the representative and customer roles or terminologies, respectively. Further, the term "speaker" can refer to either a speaker who is to be identified or speaker who need not be identified unless stated otherwise.

The speaker identification system 105 may not receive any input of voice samples, fingerprints or some other reference of a voice of the representative that identifies the representative. So, the speaker identification system 105 may have to generate the fingerprints, which can then be used for identifying a specified representative 110 in a specified conversation. The speaker identification system 105 can generate a fingerprint 160 for a specified representative 110 based on calls 140 the specified representative 110 has had with one or more customers 115. The speaker identification system 105 process the calls 140 to generate voice segments for each of the calls 140, analyzes the voice segments to identify a set of voice segments that satisfy the speaker identification criterion, e.g., share the same or similar feature across all the calls 140, and determines the voice in the set of voice segments as associated with the specified representative 110. The speaker identification system 105 generates a fingerprint 160 based on the identified set of voice segments, associates the fingerprint 160 with a user ID of the specified representative 110, and stores the fingerprint 160 in a data storage system 135. The following paragraphs describe additional details regarding the generation of the fingerprints.

In some embodiments, at least some of the calls 140 can include or be associated with metadata such as a user ID of the representative involved in the conversation. However, such metadata is optional and the speaker identification system 105 may not rely on the metadata for generating the fingerprints or for speaker identification purposes. The metadata can also have a customer ID of the customer involved in the conversation. However, the metadata would not indicate which voice in the call is of the corresponding representative. In some embodiments, the metadata can be derived video data of the call, e.g., visual data. For generating a fingerprint for a representative, the calls are selected such that (a) in at least some of the conversations the specified representative 110 is the only representative in conversation with the customers 115, that is, there is no other representative other than the specified representative 110, and (b) the customers 115 in different conversations are distinct. For example, to generate the fingerprint 160 of the specified representative 110, calls such as a first call 141 the specified representative 110 had with a first customer 116, a second call 142 with a second customer 117, a third call 143 with a third customer 118, and so on can be selected. Note that there can be more than one representative and/or customer in the conversation. However, when available, calls in which there is only one representative, e.g., the specified representative 110, and the customers are distinct in different calls are selected. The calls 140 can be stored in the data storage system 135.

The speaker identification system 105 can receive such calls 140, e.g., calls in which the customers are distinct and the specified representative 110 is the only representative, as an input, e.g., from a user associated with speaker identification system 105 or from another computing system. However, if the calls 140 are associated with metadata, the speaker identification system 105 can find and select such calls 140 using the metadata. In some embodiments, if the metadata does not include the customer IDs, the speaker identification system 105 can use other techniques, e.g., Speech, Language and Acoustic modeling techniques, to determine if the customers in each or at least some of the calls 140 are different.

After selecting the calls 140, the speaker identification system 105 processes each of the calls 140 to generate multiple voice segments, such as voice segments 125 of the first call 141. In some embodiments, a voice segment is a portion of a call that includes a human voice or a speech utterance by a human. In some embodiments, in generating the voice segments, the speaker identification system 105 can remove any background noise and/or portions that do not have a human voice, e.g., silence, music, etc., from each of the calls 140. Each of the resulting voice segments would have the voice of at least one of the speakers 120, e.g., the specified representative 110 or one of the customers 115.

The speaker identification system 105 analyzes each of the voice segments to identify the speakers 120 in the calls 140. For example, the speaker identification system 105 can cluster the voice segments to multiple clusters 150 to identify the speakers 120. The clustering process clusters the voice segments such that the voice segments that satisfy the speaker identification criterion are clustered into the same cluster. The clustering process can generate multiple clusters 150, e.g., a first cluster 151, a second cluster 152, and a third cluster 153. Typically, each cluster corresponds to voice segments of one of the speakers 120. In some embodiments, there can be more clusters than the number of speakers and/or voice segments of a speaker can be clustered into different clusters, e.g., due to some variations in the voice or background noise. However, various techniques can be used to refine the clustering process, which resolves such inconsistencies and clusters voice segments from the same speaker into the same cluster. The speaker identification system 105 can then identify a cluster, e.g., the first cluster 151, that matches a cluster selection criterion, e.g., having highest number of voice segments from each of the calls 140. The voice in the voice segments of the first cluster 151 are determined to be the voice of the specified representative 110. Since the specified representative 110 is on all or a marked majority of the calls 140 (if the calls 140 include calls without the specified representative 110), and not all the customers 115 are on all the calls 140, in some embodiments, the voice segments that overlap, e.g., have a similar or the same feature, across all the calls 140 are determined as likely to have the voice of the specified representative 110.

The speaker identification system 105 generates the fingerprint 160 for the specified representative 110 based on the voice segments in the first cluster 151. The fingerprint 160 is associated with the user ID of the specified representative 110 and stored in the data storage system 135. In some embodiments, the fingerprint 160 is representative of the feature based on which the clustering is implemented. That is, for example, if the clustering process clusters the voice segments into a cluster based on a voice of the speaker, then the fingerprint 160 is representative of the voice of the speaker. In another example, if the voice segments are clustered based on an accent or other linguistic attributes of the speaker, then the fingerprint 160 is representative of the accent or linguistic attributes voice of the speaker.

The speaker identification system 105 can repeat the above described process for other representatives of the organization for generating their fingerprints.

The clustering process can be implemented using various techniques, e.g., agglomerative clustering, K-means clustering, or density-based spatial clustering. The voice segments can be identified using various techniques, e.g., Gaussian Mixture Model (GMM)/Universal Background Model (UBM) or Deep Neural Networks (DNN). Further, the voice segments can be analyzed by generating or extracting i-vectors from the voice segments and clustering the i-vectors. In some embodiments, an i-vector is a data structure or a compact representation of speaker voice characteristics. An i-vector includes a value, which is representative of the speaker voice characteristics in the corresponding voice segment. The i-vectors can be extracted based on various features, e.g., features mentioned above. A fingerprint can also be generated using the i-vectors corresponding to the voice segments for which the i-vectors are extracted.

Further, the speaker identification system 105 can not only identify a particular representative but also representatives of a particular type, e.g., representatives of a specified age or age range, representatives having a specified accent, representatives of a specified gender, representatives having a specified physical ailment, physical condition, level of education, or other such features. For example, the clustering process can be implemented not only for identifying a particular representative but also for identifying representatives based on age, accent, gender, physical ailments, physical conditions, level of education, or other such features. Various technologies can be used to analyze the calls to identify the above features. The speaker identification system 105 can then group the voice segments based on one or more of the above features into multiple groups in which each of the groups corresponds to representatives of a particular type. For example, a first group of voice segments can correspond to "men," and a second group can correspond to "women." In another example, a group of the voice segments can correspond to speakers with "Alzheimer" physical condition, and another group can correspond to "women over 70 years" etc. The speaker identification system 105 can generate a fingerprint for each of the groups that corresponds to representatives of a particular type. The speaker identification system 105 can use the generated fingerprints to identify a type of the representative in a particular call, e.g., in any given call or a real-time call.

Note that although above paragraphs discuss selecting calls that have only one representative, the disclosed embodiments are not restricted to the described example. The speaker identification system 105 can generate the fingerprints for representatives by analyzing calls having multiple representatives as well.

Figure 2:
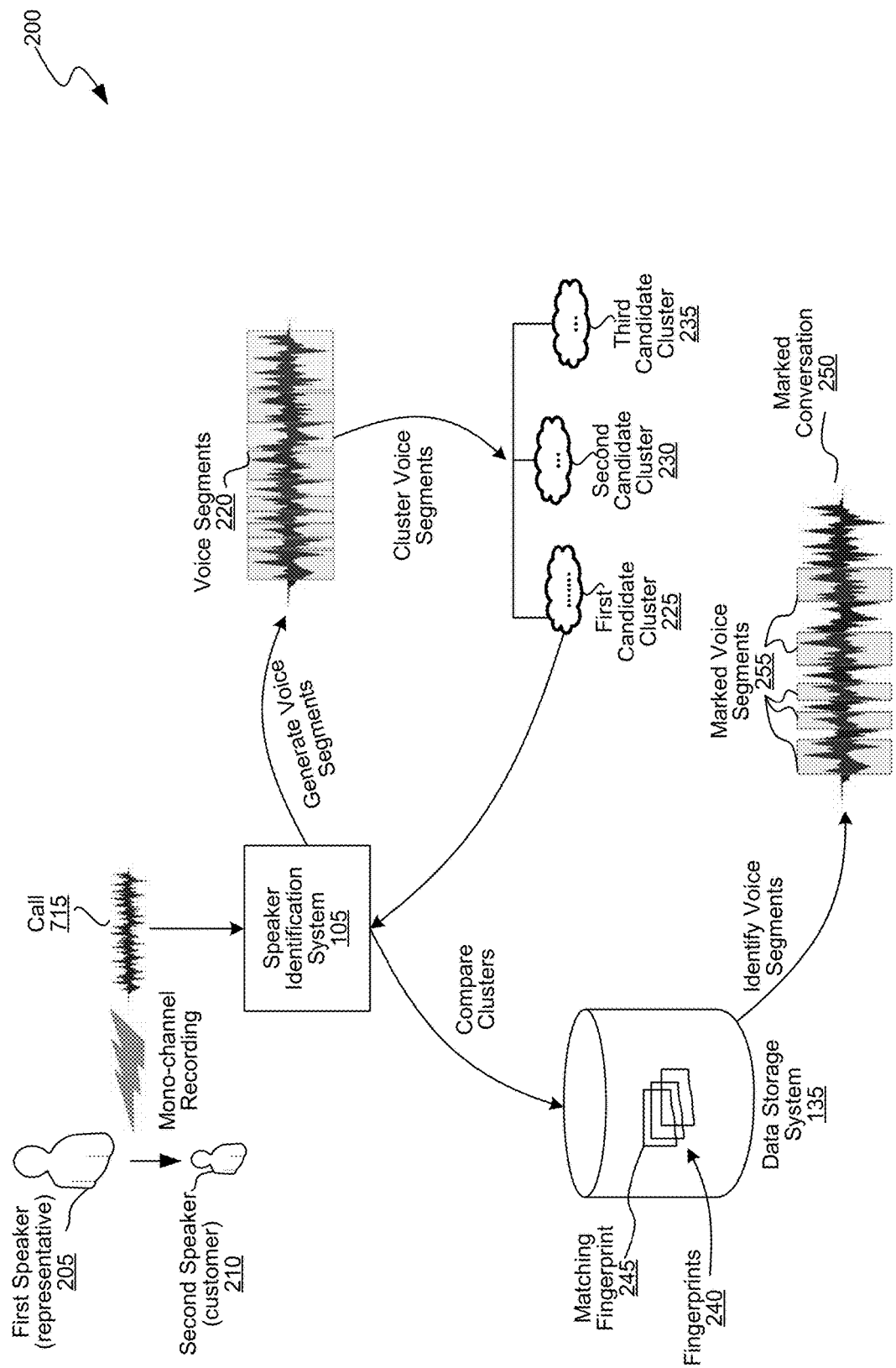
FIG. 2 is a block diagram of an example for identifying a speaker using the speaker identification system of FIG. 1, consistent with various embodiments.

FIG. 2 is a block diagram of an example 200 for identifying a speaker in a conversation using the speaker identification system of FIG. 1, consistent with various embodiments. The speaker identification system 105 can be used to identify a representative in a received call 215. The received call 215 can be of a conversation between a first speaker 205, who is a representative, and a second speaker 210, who is a customer, and can be a mono-channel call. Note that there can be more than two speakers; however, the number of speakers is limited to two in this example for ease of description. Further, the received call 215 can be a real-time data stream, e.g., audio stream, of a live conversation between the speakers, or a recording of a previous conversation.

The speaker identification system 105 processes the received call 215 to generate voice segments 220. For example, to generate the voice segments, the speaker identification system 105 can remove any background noise and/or portions that do not have a human voice, e.g., silence, music, etc., from the received call 215. The speaker identification system 105 then clusters the voice segments, e.g., as described above, into multiple clusters, e.g., a first candidate cluster 225, a second candidate cluster 230, and a third candidate cluster 235. In some embodiments, the clustering process clusters such that the voice segments satisfying the speaker identification criterion are clustered into the same cluster. As described above, each cluster corresponds to voice segments of one of the speakers. In some embodiments, voice segments of a speaker can be clustered into different clusters, e.g., due to some variations in the voice or background noise. However, various techniques can be used to refine the clustering process, which resolves such inconsistencies and clusters voice segments from the same speaker into the same cluster.

The speaker identification system 105 can then compare each of the clusters with the fingerprints 240 of various representatives stored in the data storage system 135. The speaker identification system 105 can use a matching algorithm to perform the comparing. If the speaker identification system 105 finds a matching fingerprint 245 for a particular cluster, e.g., the first candidate cluster 225, the speaker identification system 105 determines the voice in voice segments of the first candidate cluster 225 to be the voice of the representative associated with the matching fingerprint 245, e.g., the first speaker 205. The speaker identification system 105 assigns the voice segments in the first candidate cluster 225 to the first speaker 205, and generates a marked conversation 250, which indicates the voice segments or portions of the received call 215 where the first speaker 205 spoke. For example, the marked conversation 250 indicates the portions of the received call 215 where the first speaker 205 spoke as marked voice segments 255.

In some embodiments, the speaker identification system 105 performs the clustering and comparing by extracting i-vectors from the voice segments and then clustering and comparing of the extracted i-vectors with the fingerprints 240.

Figure 3:
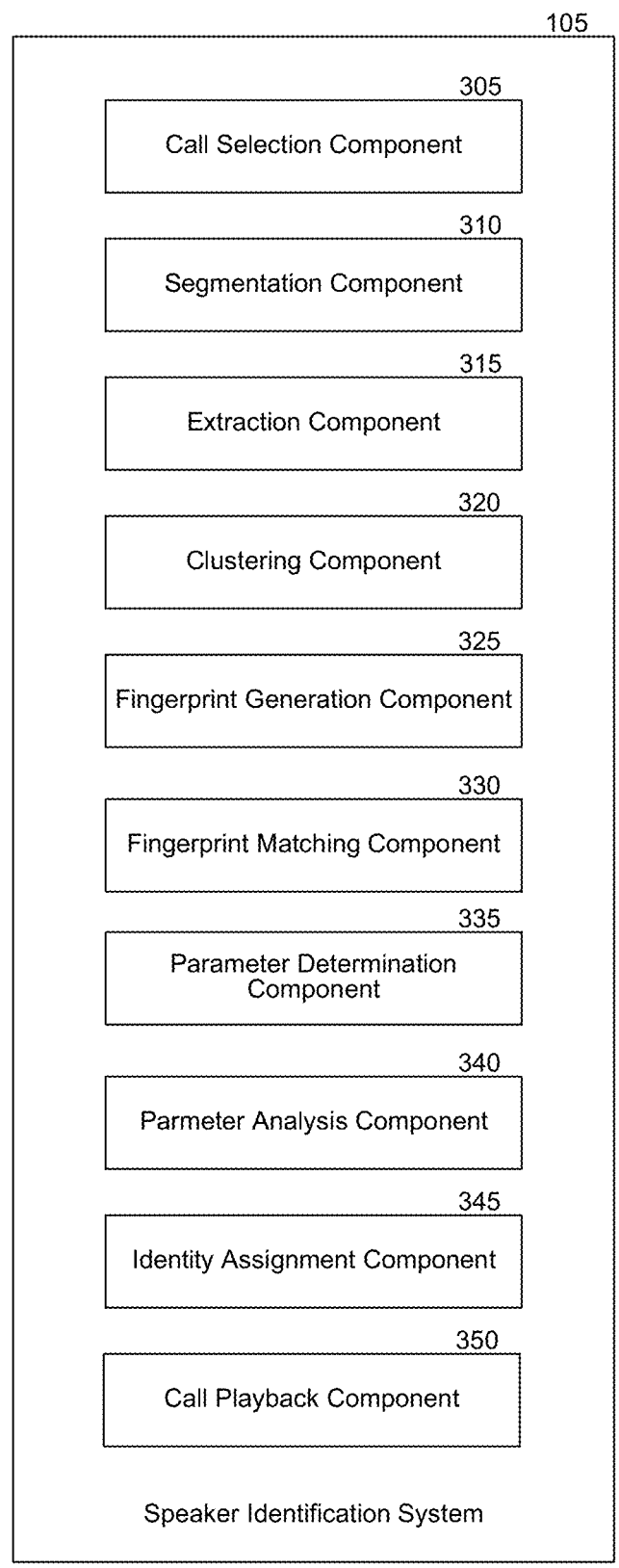
FIG. 3 is a block diagram of the speaker identification system of FIG. 1, consistent with various embodiments.

FIG. 3 is a block diagram of the speaker identification system of FIG. 1, consistent with various embodiments. The speaker identification system 105 includes a number of components that facilitate in generating fingerprints for speakers and identifying the speakers. For example, the components include a call selection component 305, a segmentation component 310, an extraction component 315, a clustering component 320, a fingerprint generation component 325 and a fingerprint matching component 330. The call selection component 305 enables selection of appropriate calls for generating a fingerprint for a representative. For example, to generate a fingerprint for the specified representative 110, the call selection component 305 can receive a set of calls, e.g., calls in which the customers are distinct across the calls and the specified representative 110 is the only representative, as an input. The call selection component 305 can receive the input from a user associated with speaker identification system 105, or from another computing system. However, if the calls 140 are associated with metadata, the call selection component 305 can select the set of calls, e.g., from the data storage system 135, using the metadata. Note that there can be more than one representative and/or customer in the call. However, the call selection component 305 selects, when available, calls in which there is only one representative, e.g., the specified representative 110, in conversation with the customers 115.

The segmentation component 310 enables generation of voice segments from the calls 140. In some embodiments, in generating the voice segments, the segmentation component 310 can remove any background noise and/or portions that do not have a human voice, e.g., silence, music, etc., from each of the calls 140. The segmentation component 310 can remove or reduce the background noise using various techniques, e.g., Latent Discriminant Analysis (LDA), probabilistic LDA, or DNN.

The extraction component 315 enables generation or extraction of i-vectors from the voice segments. The i-vectors can be extracted based on various features, e.g., features mentioned above. In some embodiments, the segmentation component 310 can remove or reduce background noise prior to the extraction of i-vectors.

The clustering component 320 can cluster the voice segments, e.g., the i-vectors extracted by the extraction component 315, to multiple clusters 150. The clustering component 320 clusters the voice segments such that the voice segments satisfying the speaker identification criterion are clustered into the same cluster. The clustering component 320 can use various techniques to resolve inconsistencies such as voice segments of the same speaker being clustered into different clusters. The clustering component 320 can identify one of the clusters 150 that satisfies the cluster selection criterion, and determines the voice in the voice segments of the identified cluster to be the voice of the specified representative 110.

The fingerprint generation component 325 can generate fingerprints for the representatives based on the voice segments in the clusters identified by the clustering component 320 for the corresponding representative. For example, the fingerprint generation component 325 generates the fingerprint 160 for the specified representative 110 based on the voice segments in the first cluster 151. The fingerprint 160 is associated with the user ID of the specified representative 110 and stored in the data storage system 135.

The fingerprint matching component 330 can be used to compare voice segments, e.g., i-vectors, in a cluster to fingerprints in the data storage system 135 to find a matching fingerprint. For example, the fingerprint matching component 330 can match clustered voice segments of a received call 215 with the fingerprints 240 in the data storage system 135 to find a matching fingerprint 245. The fingerprint matching component 330 can use various matching algorithms for comparing the clustered voice segments with the fingerprints.

Figure 8:
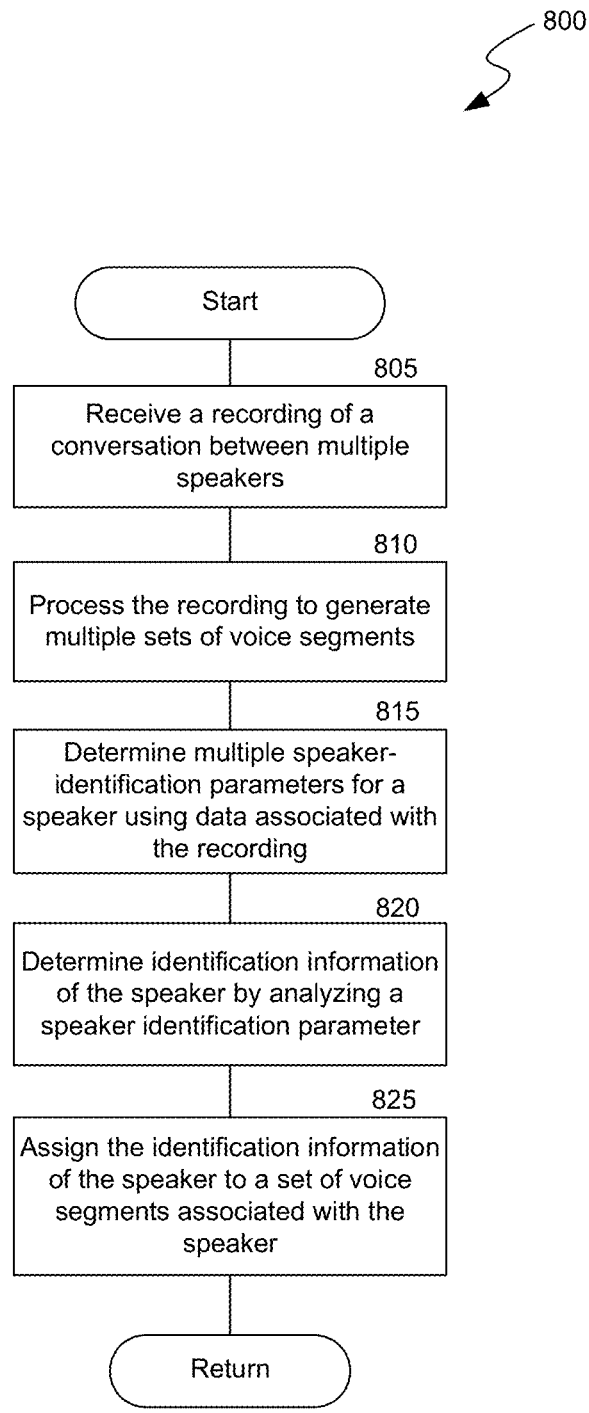
FIG. 8 is a flow diagram of a process for identifying a speaker in a call using one or more speaker-identification parameters, consistent with various embodiments.
Figure 9:
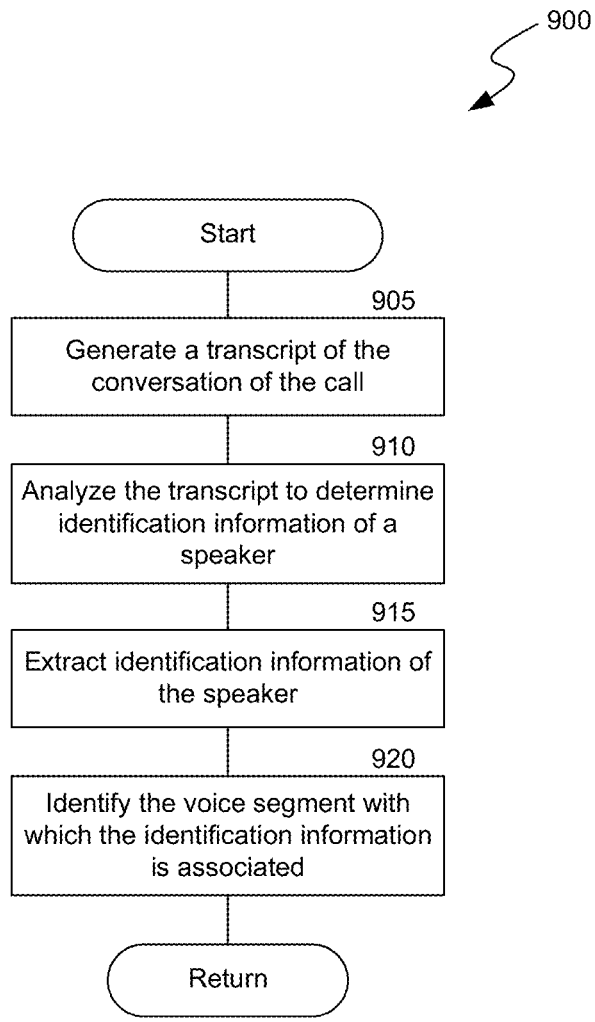
FIG. 9 is a flow diagram of a process for identifying a speaker in the call using a transcript of the call, consistent with various embodiments.
Figure 10:
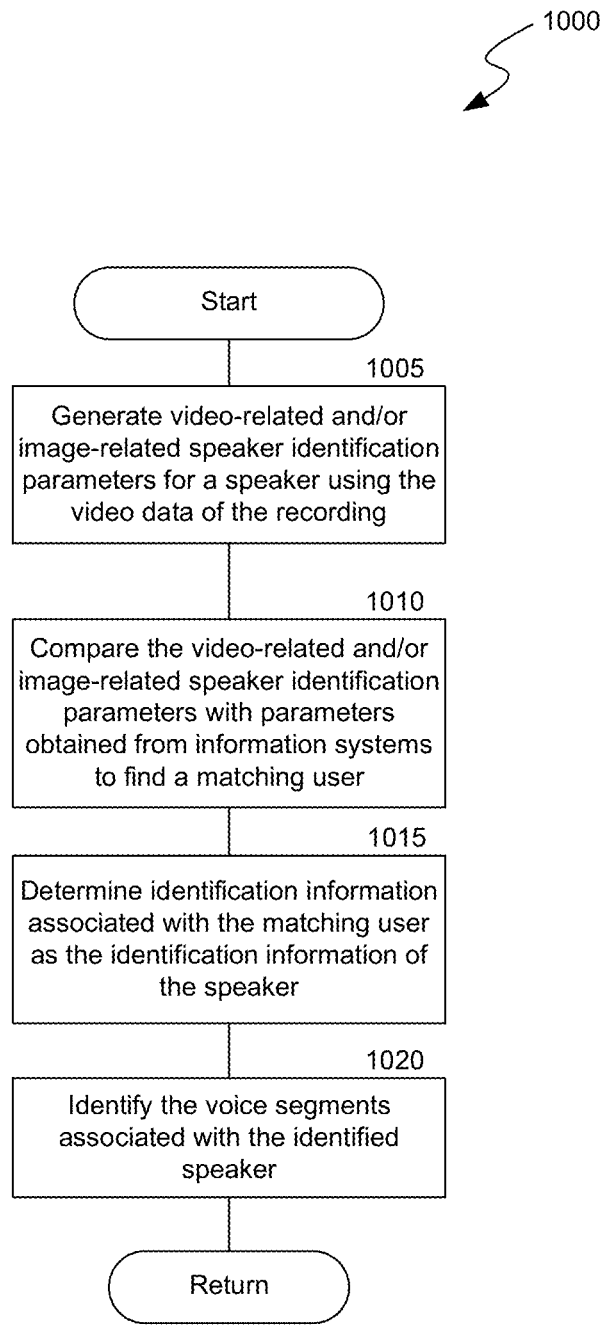
FIG. 10 is a flow diagram of another process for identifying a speaker in the call, consistent with various embodiments.

The speaker identification system 105 includes additional components, such as parameter determination component 335, parameter analysis component 340, identity assignment component 345, and call playback component 350 the details of which are described at least with reference to FIGS. 8-10.

Figure 4:
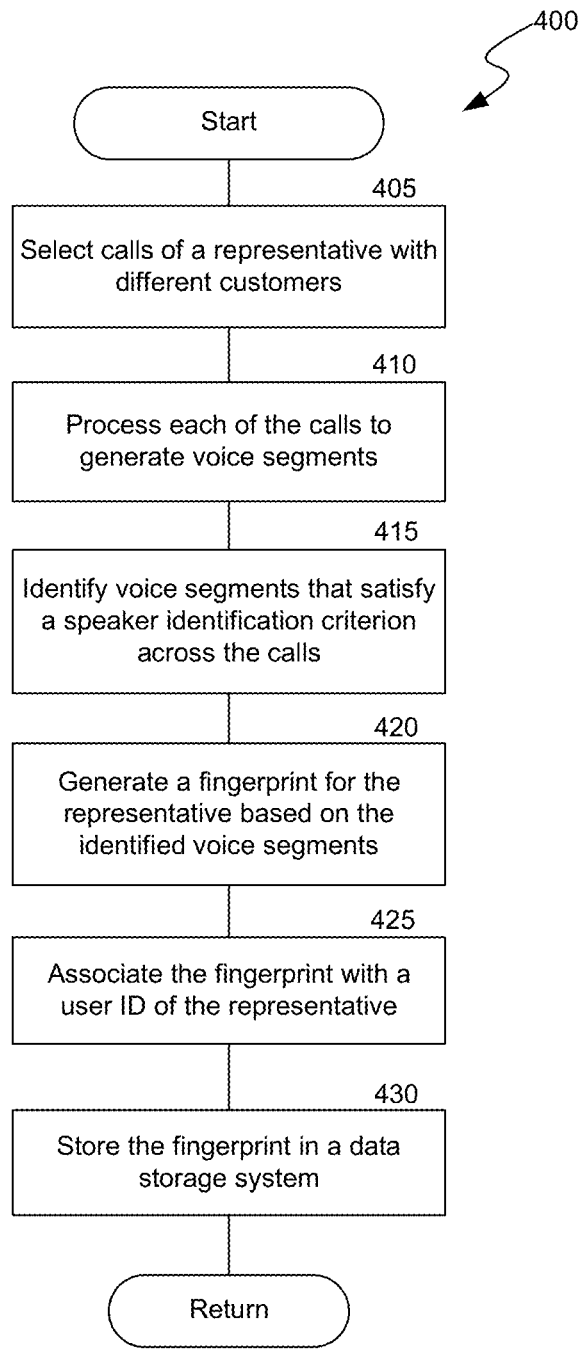
FIG. 4 is a flow diagram of a process for generating a fingerprint of a speaker, consistent with various embodiments.

FIG. 4 is a flow diagram of a process 400 for generating a fingerprint of a speaker, consistent with various embodiments. In some embodiments, the process 400 can be implemented using the speaker identification system of FIG. 1. At block 405, the call selection component 305 selects calls between a representative and different customers. For example, as described at least with reference to FIGS. 1 and 3, to generate a fingerprint for the specified representative 110, the call selection component 305 selects or receives calls 140 in which (a) the specified representative 110 is the only representative who is in conversation with the customers 115 in at least some of the calls, and (b) the customers 115 are distinct across the calls.

At block 410, the segmentation component 310 processes the selected calls to generate voice segments for each of the selected calls. For example, as described at least with reference to FIGS. 1 and 3, the segmentation component 310 can remove portions that do not have a human voice, e.g., silence, music, etc., from each of the calls 140 to generate the voice segments. The segmentation component 310 can also remove or reduce the background noise from each of the generated voice segments.

At block 415, the clustering component 320 identifies voice segments that satisfy a speaker identification criterion. For example, as described at least with reference to FIGS. 1 and 3, the clustering component 320 identifies those voice segments that have the same or similar feature across all the calls 140, and determines the voice in those voice segments to be the voice of the specified representative 110. Additional details with respect to identifying the voice segments that satisfy the speaker identification criterion are described at least with reference to FIG. 5 below.

At block 420, the fingerprint generation component 325 generates a fingerprint for the representative based on the voice segments identified in block 415. For example, as described at least with reference to FIGS. 1 and 3, the fingerprint generation component 325 generates the fingerprint 160 for the specified representative 110 based on the voice segments, e.g., i-vectors extracted from the voice segments, that have the same or similar feature across all the calls 140.

At block 425, the fingerprint generation component 325 associates the fingerprint with a user ID of the representative. For example, as described at least with reference to FIGS. 1 and 3, the fingerprint generation component 325 associates the fingerprint 160 with the user ID of the specified representative 110.

At block 430, the fingerprint generation component 325 stores the fingerprint generated in block 425 at the data storage system 135. For example, as described at least with reference to FIGS. 1 and 3, the fingerprint generation component 325 stores the fingerprint 160 at the data storage system 135.

Figure 5:
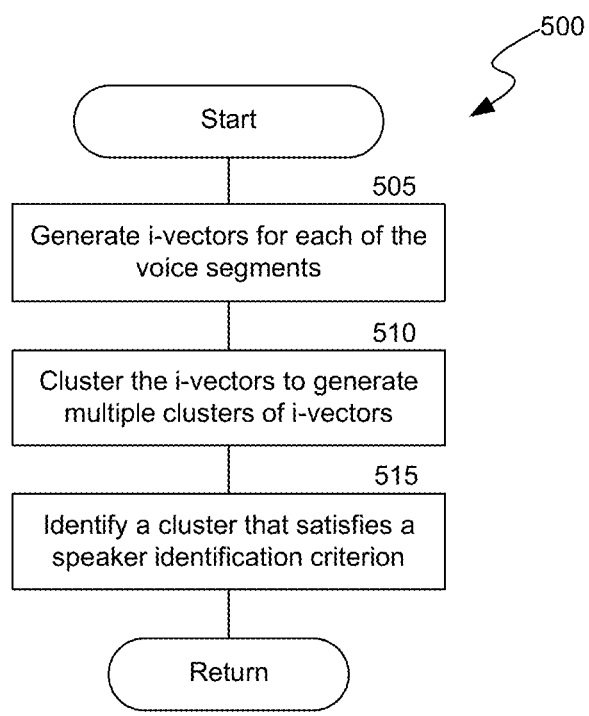
FIG. 5 is a flow diagram of a process for clustering voice segments of recordings, consistent with various embodiments.

FIG. 5 is a flow diagram of a process 500 for clustering the voice segments, consistent with various embodiments. In some embodiments, the process 500 can be implemented in the speaker identification system 105 of FIG. 1. In some embodiments, the process 500 can be implemented as part of block 415 of process 400. At block 505, the extraction component 315 generates i-vectors from each of the voice segments. In some embodiments, an i-vector is a data structure or a compact representation of speaker voice characteristics. An i-vector includes a value, which is representative of the speaker voice characteristics in the corresponding voice segment. The i-vectors can be extracted based on various features, e.g., features mentioned above, and can be generated using various known techniques.

At block 510, the clustering component 320 clusters the i-vectors to generate multiple clusters of i-vectors. The clustering component 320 clusters the i-vectors of the voice segments such that the voice segments satisfying the speaker identification criterion, e.g., that share the same or a similar feature, are clustered into the same cluster. The clustering component 320 can use various techniques to cluster the i-vectors, e.g., agglomerative clustering, K-means clustering, or density-based spatial clustering. In some embodiments, each of the clusters corresponds to a voice of one of the speakers.

At block 515, the clustering component 320 identifies one of the clusters that satisfies the cluster selection criterion, e.g., having highest number of voice segments from each of the calls selected in block 405 of process 400, and the process returns. For example, as described at least with reference to FIGS. 1 and 3, the clustering component 320 identifies the first cluster 151 as satisfying the cluster selection criterion, and determines the voice in the voice segments of the identified cluster to be the voice of the specified representative 110.

Figure 6:
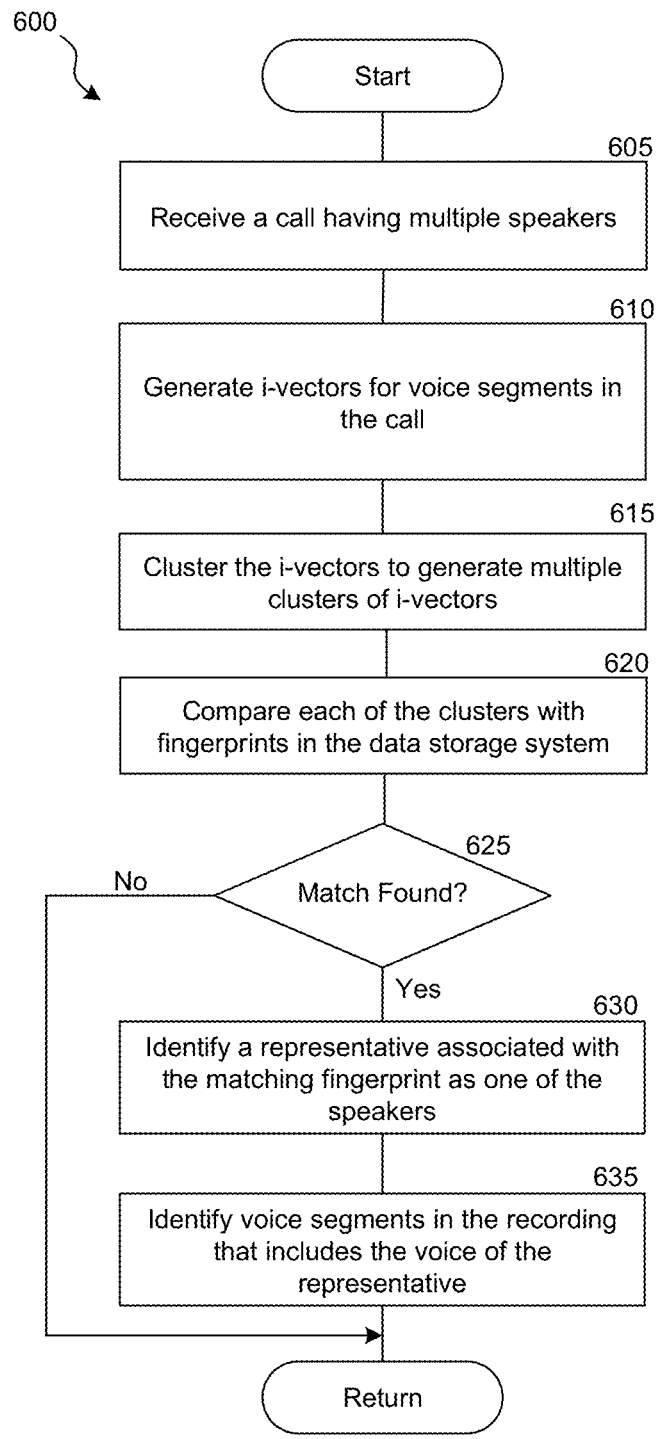
FIG. 6 is a flow diagram of a process for identifying a speaker in a conversation, consistent with various embodiments.

FIG. 6 is a flow diagram of a process 600 for identifying a speaker in a conversation, consistent with various embodiments. In some embodiments, the process 600 can be implemented in the speaker identification system 105 of FIG. 1. At block 605, the call selection component 305 receives a call between a representative and a customer, e.g., received call 215 of FIG. 2.

At block 610, the extraction component 315 generates i-vectors for various voice segments of the received call. For example, the extraction component 315 extracts the i-vectors from the voice segments 220 of the received call 215.

At block 615, the clustering component 320 clusters the i-vectors into multiple clusters. The clustering component 320 clusters the i-vectors of the voice segments such that the voice segments satisfying the speaker identification criterion, e.g., that share the same or a similar feature, are clustered into the same cluster. For example, the clustering component clusters the i-vectors to the first candidate cluster 225, the second candidate cluster 230, and the third candidate cluster 235.

At block 620, the fingerprint matching component 330 compares each of the clusters with the fingerprints stored in the data storage system. The fingerprint matching component 330 can use various matching algorithms for comparing the clustered i-vectors with the fingerprints.

At determination block 625, if the fingerprint matching component 330 finds a matching fingerprint for a particular cluster, at block 630, the fingerprint matching component 330 identifies the representative associated with the matching fingerprint as the representative who is in the conversation of the received call. On the other hand, if no matching fingerprint is found, the process returns.

At block 635, the fingerprint matching component 330 identifies the voice segments or portions of the received call where the identified representative spoke.

Although FIGS. 1-6 describe identifying a representative in a call, the speaker identification system 105 can be used to identify any speaker in the call, such as a representative of an organization, a customer or a potential customer of the organization, or any other person conversing with the representative in the call.

Figure 7:
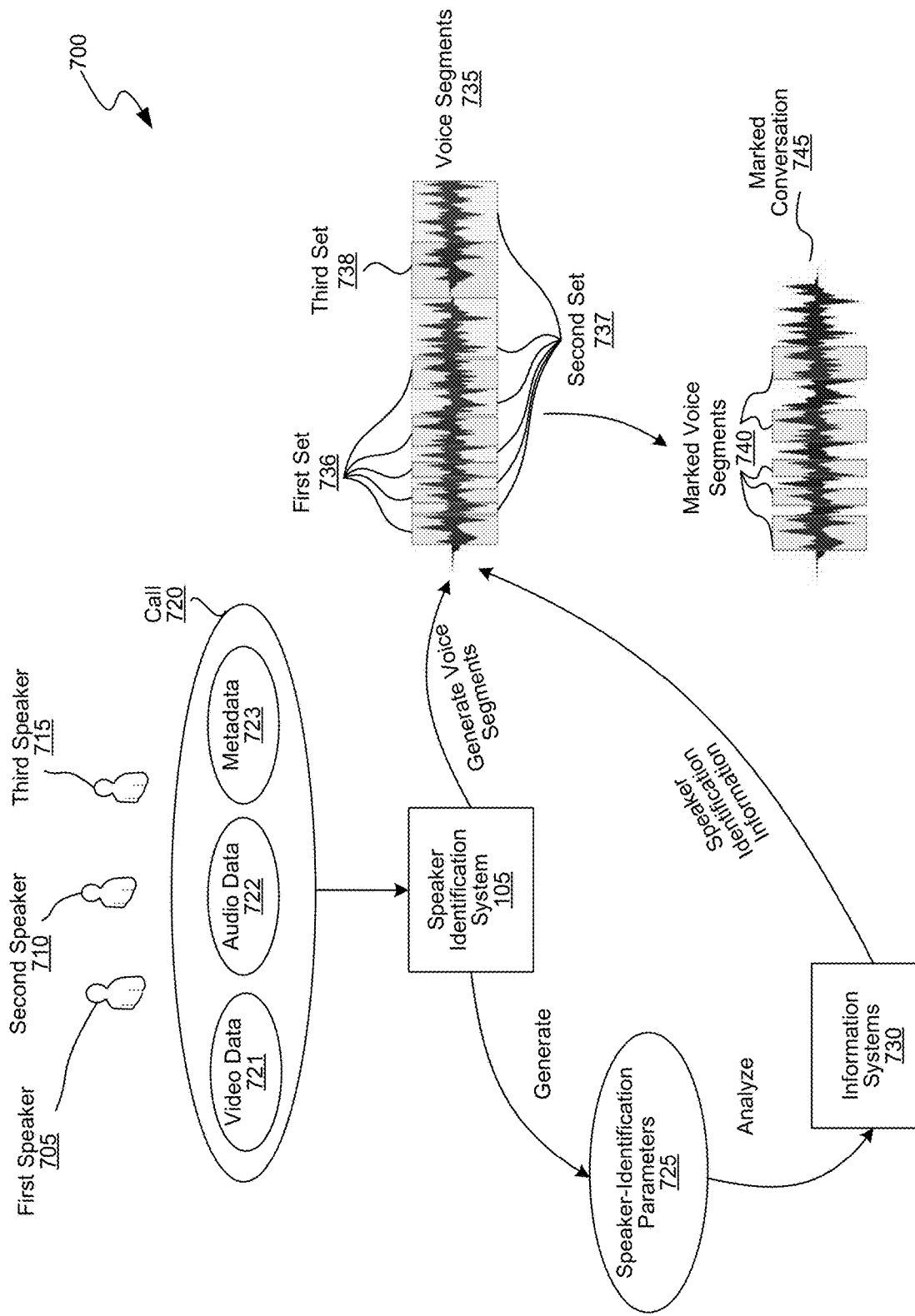
FIG. 7 is a block diagram of another example for identifying a speaker in a conversation, consistent with various embodiments.

FIG. 7 is a block diagram of an example 700 for identifying a speaker in a conversation, consistent with various embodiments. The speaker identification system 105 can be used to identify any speaker in a call 720. In some embodiments, the call 720 is similar to the call 215. The call 720 can be of a conversation between a first speaker 705, who is a representative, and a second speaker 710 and third speaker 715, who are customers. While the speakers 705-715 are described as being representatives and/or customers, the speakers 705-715 are not restricted to such roles, and can be of any role. Further, the call 720 can be a real-time data stream of a live conversation between the speakers, or a recording of a previous conversation. The call 720 can include video data 721, which can correspond to a video portion of the call 720, such as a video feed from computer devices associated with the speakers. The call can include audio data 722, which can correspond to an audio portion of the call 720, such as an audio feed from computer devices associated with the speakers. The call 720 can also include metadata 723, which can include information regarding all or some invitees in the call, such as a name, email ID, user ID. In some embodiments, the metadata 732 is similar to the metadata described in association with FIGS. 1-6.

The speaker identification system 105 can generate one or more speaker-identification parameters 725, which can be used in determining an identity of a speaker in the call 720. The speaker-identification parameters 725 include any text, audio, video, or image-related features of the call 720. For example, the speaker identification system 105 can generate a transcript of the call 720 as one of the speaker-identification parameters 725. The transcript can include any speaker introduction information provided by any of the speakers that identify or can be used to derive the identity of a speaker.

In another example, the speaker identification system 105 can generate a facial image of a speaker as one of the speaker-identification parameters 725.

In another example, the speaker identification system 105 can generate an image of a setting or a scene in which a speaker is located during the conversation as one of the speaker-identification parameters 725. For example, the scene image can be an image of a room in which the speaker is located. The scene image can include a background portion, such as a wall, window, etc. The scene image can include any objects in the scene, such as a telephone, computer, furniture, stationery. The scene image can include any company logos, names, or any other information that can be used to identify a speaker.

In another example, the speaker identification system 105 can generate recognize and capture any textual information associated with a speaker as one of the speaker-identification parameters 725. For example, the speaker identification system 105 can recognize from the video feed any textual data, such as a name tag or a name plate having a name of the speaker placed on a table in front of the speaker. The speaker identification system 105 can also recognize any textual data, such as a name or ID of the speaker displayed in an application, e.g., a video conferencing application that is used for the call.

The speaker identification system 105 can generate voice segments 735 from the audio data 722 and group the voice segments 735 for each speaker, e.g., as described at least with reference to FIGS. 1-6, such that a first set of voice segments 736 has voice segments corresponding to the first speaker 705, a second set of voice segments 737 has voice segments corresponding to the second speaker 710, and a third set of voice segments 738 has voice segments corresponding to the third speaker 715. In some embodiments, the voice segments 735 are similar to the voice segments 125 of FIG. 1. The speaker identification system 105 can use the voice segments as one of the speaker-identification parameters 725.

The speaker identification system 105 can also use a language model, which is statistical analysis of the language used by a speaker or a group of speakers, as one of the speaker-identification parameters 725. For example, a usage of a phrase such as "hasta la vista baby" can be representative of the first speaker 705. In another example, the usage of a phrase such as "yes we can" can be representative of the second speaker 710. In another example, the usage of words or phrases that are indicative of politeness, such as "perhaps", "you could", or "we should not" can be representative of a particular speaker, e.g., a service provider, while usage of a more direct register of language such as "maybe", "you can" "you will", or "we won't" can be representative of another speaker, e.g., a busy entrepreneur client of the particular speaker. The above are simplified examples, as all speakers might use all these words or phrases, but at a different frequency and with a different distribution. The statistical analysis of the language usage by a speaker or a group of speakers reflects how different speakers speak, that is, the words, phrases, or sounds made by a speaker, their frequencies and distribution in the speech. This may be for example reflected in how often people use words such as "ahhh," "you know," "like," or "ummm", how long their utterances are, or how likely it is that a word or a phrase "X" is said after a word or a phrase "Y," and such similar aspects. A language model can be generated using the audio portion of the calls 140, transcripts of the calls 140, or any other such data that is necessary or useful in generating the language model.

Note that that language models can help not only in identifying a specific person, but rather in identifying a group of people, such as British vs. Americans (e.g., using "dear" vs. "expensive" to express the same thing), or age groups (teenagers using slang or cultural reference not used by adults), or even women vs. men (e.g., the term "my husband" will usually be said by a woman not a man). The speaker identification system 105 can use such language models as speaker-identification parameters 725 to identify a speaker in the call 720.

The speaker identification system 105 can perform a statistical analysis of various conversations, such as calls 140, to generate one or more language models for one or more speakers. A language model may be generated for each of the speakers or for a subset of the speakers, and can be associated with identification information of the corresponding speaker, e.g., user ID. The language models can be stored in the data storage system 135. Although the speaker identification system 105 can use a language model as the only speaker identification parameter in identifying a speaker, in some embodiments, the speaker identification system 105 uses the language model in addition to or as one of the speaker-identification parameters 725 used in identifying the speaker.

The speaker identification system 105 can also use any information from the metadata 723, such as the names, IDs, email IDs or any other contact information of the speakers included in a meeting invite for the call 720, as the speaker-identification parameters 725.

While the above parameters are examples of the speaker-identification parameters 725, the speaker-identification parameters 725 are not restricted to the above parameters; the speaker identification system 105 can generate various other additional speaker-identification parameters.

The speaker identification system 105 analyzes one or more of the speaker-identification parameters 725 to determine an identity of a speaker. In some embodiments, the speaker identification system 105 can use data from information systems 730 in the analysis of the speaker-identification parameters 725 to identify the speaker. The information systems 730 can be any computer-network accessible source that has contact information or any other identification information of a user, or has information that can be used to derive the identification information of a user. For example, the information systems 730 can be an internal source, e.g., within an organization where the speaker identification system 105 is used, such as the data storage system 135 or a directory server in an organization having contact information or any other identification information of their employees. In another example, the information systems 730 can be an external source such as a social networking service, a blogging service, a professional networking service or any other system or service that has contact information or any other identification information of a user.

The speaker identification system 105 can use the speaker-identification parameters 725 and the information from the information systems 730 in determining the identification information of a speaker. For example, the speaker identification system 105 can compare a facial image of the first speaker 705 with one or more facial images from the information systems 730, such as a social networking service, to determine the identity of the first speaker 705. In another example, the speaker identification system 105 can analyze the transcript to determine if a speaker provided any identification information during the conversation and extract the identification information if it is provided. In still another example, the speaker identification system 105 can analyze the scene image associated with a speaker to determine identification information associated with a speaker. In still another example, the speaker identification system 105 can analyze the call 720 to generate a language model for one or more of the speakers and compare the language models with those stored in the data storage system 135 to determine identification information associated with a speaker.

Additional details with respect to determining the identification information using the speaker-identification parameters 725 and the information systems 730 are described at least with reference to FIGS. 8-10.

After the identification information of a speaker is determined, the speaker identification system 105 marks the voice segments associated with the speaker with the identification information of the speaker to generate the marked voice segments 740. For example, after determining that identification information of the first speaker 705 as "John Doe," the speaker identification system 105 marks the first set of voice segments 736 as associated with "John Doe." The speaker identification system 105 can similarly mark the voice segments of other speakers and store the call 720 with the marked voice segments as marked conversation 745 in the storage system 135. In some embodiments, the marked voice segments 740 are similar to the marked voice segments 255 and the marked conversation 745 to the marked conversation 250 of FIG. 2.

FIG. 8 is a flow diagram of a process 800 for identifying a speaker in a call using one or more speaker-identification parameters, consistent with various embodiments. In some embodiments, the process 800 can be implemented using the speaker identification system 105 of FIG. 1. At block 805, the call selection component 305 receives a call between multiple speakers, e.g., call 720 of FIG. 7. The call can be a recording of the conversation between the speakers or a real-time data stream of a real-time interaction between the speakers.

At block 810, the extraction component 315 processes the audio data of the call to generate multiple voice segments of the call. For example, the extraction component 315 processes the audio data 722 of the call 720 to generate the voice segments 735. Further, the clustering component 320 can group the voice segments such that a set of voice segments is generated for each speaker of the call. For example, the clustering component 320 groups the voice segments 735 to generate the first set of voice segments 736, the second set of voice segments 737, and the third set of voice segments 738 for the first speaker 705, second speaker 710 and the third speaker 715, respectively.

At block 815, the parameter determination component 335 determines multiple speaker-identification parameters, e.g., speaker-identification parameters 725, from the data associated with the call. The speaker-identification parameters can be used in determination of an identity of a speaker. The speaker-identification parameters include any text, audio, video, or image-related features of the call. An example of the speaker-identification parameters includes one or more of voice segments of the call, transcript of the call, facial image of a speaker, scene image associated with a speaker, text extracted from the video of the call, language model of a speaker, metadata of the call.

At block 820, the parameter analysis component 340 analyzes one or more of the speaker-identification parameters to determine an identity of the speaker. The parameter analysis component 340 can use the speaker-identification parameters 725 and the information from the information systems 730 in determining the identity of a speaker. For example, the parameter analysis component 340 can compare a facial image of the first speaker 705 with one or more facial images from the information systems 730, such as a social networking service, to determine the identity of the first speaker 705. In another example, the parameter analysis component 340 can analyze the transcript to determine if a speaker provided any identification information during the conversation and extract the identification information if it is provided. In still another example, the parameter analysis component 340 can analyze the scene image associated with a speaker to determine identification information associated with a speaker. In yet another example, the parameter analysis component 340 can compare a set of voice segments associated with a speaker to fingerprints from the information systems 730, e.g., in the data storage system 135 as described at least with respect to FIGS. 2 and 6, to find a matching fingerprint, and then obtain the identification information associated with the matching fingerprint.

In still another example, the parameter analysis component 340 can analyze a language model of a speaker, e.g., by comparing the language models of the speakers with those stored in the data storage system 135, to determine identification information associated with a speaker.

The identification information determined by the parameter analysis component 340, regardless of which speaker identification parameter is used to perform the analysis, can include one or more of a name of a speaker, an alias of the speaker, an email ID of the speaker, an organization with which the speaker is associated, etc.

The parameter analysis component 340 may determine the identity of the speaker by performing the analysis of one speaker-identification parameter or multiple speaker-identification parameters. In some embodiments, the parameter analysis component 340 analyzes multiple speaker-identification parameters to determine the identity of the speaker with a higher accuracy. The parameter analyses component can analyze the speaker-identification parameters in any order, e.g., random, or a user-defined order. Further, a speaker-identification parameter may be associated with a weight and different speaker-identification parameters may be associated with different weights. In some embodiments, if the identity of a speaker determined using two different speaker-identification parameters is different, the parameter analysis component 340 can consider the identity of the speaker determined using the speaker-identification parameter that has a higher weight.

After the parameter analysis component 340 determines the identification information of the speaker, at block 825, the identity assignment component 345 assigns the identification information to a set of voice segments associated with the speaker. For example, if the parameter analysis component 340 determines the identification information of the first speaker 705 as "John Doe," the identity assignment component 345 assigns that identification information to the first set of voice segments 736 to generate marked voice segments 740. The marked voice segments 740 indicate that the first speaker 705 associated with marked voice segments 740 is "John Doe." The identity assignment component 345 can similarly mark the voice segments of other speakers and store the call 720 with the marked voice segments as marked conversation 745 in the data storage system 135.

In some embodiments, a user, such as a representative of the organization, a manager or a supervisor of the organization, may want to listen to portions of the call wherein a specified speaker spoke. The user may specify the details regarding the call, e.g., call ID which identifies each of the calls stored in the data storage system 135 distinctly, and identification information of the specified speaker, e.g., name, to the speaker identification system 105. The call playback component 350 retrieves the call, identifies the voice segments or portions of the call associated with the specified speaker, and plays back the identified portions. The call playback component 350 can playback only the audio portion, video portion or both.

FIG. 9 is a flow diagram of a process for identifying a speaker in the call using a transcript of the call, consistent with various embodiments. In some embodiments, the process 900 can be implemented using the speaker identification system 105 and can be executed as part of blocks 815 and 820 of the process 800 of FIG. 8.

At block 905, the parameter determination component 335 generates a transcript of the conversation of the call. For example, the parameter determination component 335 generates a transcript of the call 720 by analyzing the audio data 722 of the call 720. In some embodiments, the parameter determination component 335 can also include additional information in the transcript, such as the speakers of the call 720 and which speaker spoke when. For example, the transcript can include information regarding the speakers of the call 720, such as email IDs, aliases and/or names, which can be obtained from the metadata 723 of the call. Continuing with the example, the transcript may indicate that there are three speakers in the call (which can be determined based on the number of invitees in the call from the metadata and/or analysis of the voice segments as described at least with reference to FIGS. 2 and 6), and that the three speakers are "John Doe," "Jane Doe" and "James Bond" (which can be determined based on the invitee information in the metadata). In some embodiments, the metadata 723 may not have the name but an email instead, e.g., "jdoe@bestcompany.com" instead of "John Doe."

At block 910, the parameter analysis component 340, analyzes the transcript to determine if any identification information of a speaker was provided during the conversation. For example, the transcript can indicate that one of the speakers uttered the sentence "This is John Doe." The parameter analysis component 340 can determine that the sentence is an introduction/identification information of the one of the speakers.

In an event the transcript has the identification information, at block 915, the parameter analysis component 340 extracts the identification information from the transcript. For example, the parameter analysis component 340 extracts "John Doe" from the sentence "This is John Doe." The sentence having the introduction information can be in various forms, e.g., "My name is John Doe," "I am John Doe," "John Doe from Best Company," "John Doe, Vice President, Best Company" etc., and regardless of the form in which the introduction information is provided in the transcript, the parameter analysis component 340 can determine the identification information of the speaker.

In some embodiments, the parameter analysis component 340 analyzes the transcript to generate a language model for one or more speakers and analyzes the language model, e.g., by comparing the language models of the speakers with those stored in the data storage system 135, to determine if the language model of a speaker in the call 720 matches with any of the language models in the data storage system 135, and if there is a match, determines identification information associated with the speaker from the matching language model.

The parameter analysis component 340 determines the identification information using one or more techniques, e.g., automatic speech recognition, a rule-based technique, semantic analysis (e.g., parsing, noun chunking, part of speech tagging), artificial intelligence (AI), machine learning (ML), or natural language processing (NLP).

At block 920, the parameter analysis component 340 identifies the voice segment at which the identification information was provided, and then determines the speaker associated with the voice segment. For example, the parameter analysis component 340 can identify that the voice segment, which has identification information of a speaker, is associated with the first speaker 705. The parameter analysis component 340 can then indicate to the identity assignment component 345 that the first speaker 705 is "John Doe." The identity assignment component 345 can then assign the identification information "John Doe" to all voice segments associated with the first speaker 705, such as the first set of voice segments 736.

In some embodiments, the parameter analysis component 340 can verify the identification information before assigning it to the voice segments. For example, the parameter analysis component 340 can verify the identification information obtained from the transcript with the information obtained from the metadata of the call, such as names, aliases or email IDs of the invitees. For example, the parameter analysis component 340 can verify the identification information "John Doe," obtained from the transcript matches with one or more of the invitees of the call by comparing with names of the invitees in the metadata 732 "John Doe," "Jane Doe" and "James Bond." In some embodiments, the parameter analysis component 340 can verify the identification information obtained from the transcript with an employee directory service of the organization. For example, if the parameter analysis component 340 determines from the analysis of the transcript that the speaker is "John Doe," from "Best Company" and has email ID "jdoe@bestcompany.com," the parameter analysis component 340 can verify the above details by accessing an employee directory service of the organization and/or a social networking service and comparing the identification information.

In some embodiments, the parameter analysis component 340 can also provide a measure of confidence, which can indicate an accuracy of the speaker identification information determined by the parameter analysis component 340. The measure of confidence can be provided in any scale. In some embodiments, the measure of confidence is provided as a percentage in which higher the accuracy in determining the identification information the higher the percentage. For example, the identification information that is successfully verified with one or more sources has a higher measure of confidence than the identification information that is not verified. In some embodiments, the measure of confidence is higher when all of the identification information matches with identification information from one or more sources than when none or only a portion of the identification matches. For example, the measure of confidence is higher when all of the identification such as "John Doe," "Best Company" and email ID "jdoe@bestcompany.com" match with the information of the speaker obtained from one or more sources than when only a portion, e.g., "John Doe," matches. In some embodiments, the user defines whether to verify the identification information, and if yes, the logic to perform the verification, and how to determine the measure of confidence based on the verification.

In some embodiments, the introduction information of a speaker may be provided by another speaker during the conversation. For example, a first speaker may ask "Are you John Doe?" to which a second speaker may respond "yes." The parameter analysis component 340 can determine that the identification information "John Doe" corresponds to a speaker associated with voice segment having the voice "yes" and not to the speaker associated with voice segment having the voice "Are you John Doe?" The parameter analysis component 340 can identify the speaker accordingly.

FIG. 10 is a flow diagram of another process for identifying a speaker in the call, consistent with various embodiments. In some embodiments, the process 1000 can be implemented using the speaker identification system 105, and can be executed as part of blocks 815 and 820 of the process 800 of FIG. 8.

At block 1005, the parameter determination component 335 determines video-related or image-related speaker identification parameters from video data of a call. For example, the parameter determination component 335 can analyze the video data 721 of the call 720, which includes video transmission from the speakers of the call 720, to generate a facial image of a speaker as one of the speaker-identification parameters. In another example, the parameter determination component 335 can generate a scene image, which is an image of a scene or setting, such as a room the speaker is located at during the call 720. The scene image can include a background portion, such as a wall of the room, window in the room, etc. The scene image can include any objects in the scene, such as a telephone, a computer, furniture, stationery. The scene image can include any company logos, names, or any other information in the scene that can be used to identify a speaker. In another example, the parameter determination component 335 can analyze the video data 721 of the call 720, to capture or recognize any textual data, e.g., using OCR, that can be used to identify the speaker. For example, the parameter determination component 335 can recognize from the video feed any textual data, such as a name tag or a name plate having a name of the speaker placed on a table in front of the speaker. The parameter determination component 335 can also recognize any textual data, such as a name or ID of the speaker displayed in an application, e.g., a video conferencing application that is used for the call 720.

At block 1010, the parameter analysis component 340 analyzes one or more of the video-related or image-related speaker identification parameters to determine the identification information of a speaker. In some embodiments, the parameter analysis component 340 compares the facial image of a speaker with one or more facial images of the speakers obtained from the information systems 730 to determine the identity of the speaker. For example, the parameter analysis component 340 can obtain contact information of the speakers, such as names, aliases, email IDs, from the metadata 723, and use that information to access the profiles of the speakers in the information systems 730, such as a social networking service, and obtain facial images of those speakers from the social networking service. The parameter analysis component 340 can compare the facial image of the speaker obtained from the video data 721 with images of the speakers obtained from the social networking service to determine a matching image. The parameter analysis component 340 can use any facial recognition technique in performing the analysis.

Upon finding a matching image, at block 1015, the parameter analysis component 340 obtains the identification information associated with the matching image from the social networking service as the identification information of the speaker whose facial image is analyzed.

Referring back to block 1010, in some embodiments, the parameter analysis component 340 analyzes the scene image associated with a speaker to determine the identification information of the speaker. For example, the scene can have some characteristics, e.g., furniture, computers, a painting on the wall, placement of the objects in the scene, background of the scene, that are typical of a particular speaker or an organization. The parameter analysis component 340 can analyze the scene image to determine various characteristics of the scene, and determine the identification information of a speaker using one or more of those characteristics. For example, consider that a room in which the first speaker 705 is located during the conversation has a specified characteristic, e.g., a wallpaper in the background or an amount of light in the room, which is typical of a specified organization the first speaker 705 is associated with. The parameter analysis component 340 analyzes the scene image, e.g., using one or more image analysis/recognition techniques, extracts the specified characteristic and determines that the specified characteristic in the scene image is associated with the specified organization. By determining that the specified characteristic is associated with the specified organization, the parameter analysis component 340 can then narrow the further analysis of the first speaker 705 to the specified organization, e.g., determine an employee in the employee directory of the specified organization whose facial image matches with the facial image of the first speaker 705. The parameter analysis component 340 can then obtain the identification information associated with the matching image.

In some embodiments, the parameter analysis component 340 can analyze the scene image by comparing the scene image of the first speaker 705 with various scene images from the information systems 730, e.g., using image recognition, image matching or image analysis techniques. The parameter determination component 335 can store scene images associated with various speakers at the information systems 730, e.g., data storage system 135, which are tagged with identification information of the corresponding speakers. The tagged identification information may have been obtained or determined using one or more speaker-identification parameters 725 described above. For example, consider that the parameter analysis component 340 determined the identification information of the first speaker 705 in a first call using facial recognition or a transcript associated the first call. The parameter determination component 335 can store a scene image associated with the first speaker 705 and tag the scene image with the identification information associated the first speaker 705, e.g., name of the speaker and/or the organization. The parameter analysis component 340 can further analyze the scene image to determine the various characteristics of the scene and associate the characteristics of the scene with the identification information of the first speaker 705, and store the association with the scene image at the information systems 730. The parameter analysis component can use such scene images stored at the information systems 730 for future analyses.

When a request is received to perform the analysis using the scene image associated with a speaker, the parameter analysis component 340 compares the scene image with various scene images from the information systems 730 to find a matching image. In some embodiments, two scene images match when one or more characteristics of the scene in those images match. If a matching scene image is found, the identification information associated with the matching scene image is retrieved. The parameter analysis component 340 determines if the retrieved identification information includes the required identification information. If the retrieved identification information does not include the required identification information, the parameter analysis component 340 continues to perform the analysis using one or more other speaker-identification parameters based on the retrieved information. For example, if the required identification information is a name of the speaker but the retrieved identification information includes the name of organization instead, the parameter analysis component 340 continues to perform the analysis to determine the name of the speaker, e.g., use the name of the organization in the retrieved identification information to determine an employee in the employee directory of the organization whose facial image matches with the facial image of the speaker.

Referring back to block 1010, the parameter analysis component 340 can analyze the textual data associated with the call 720 to determine the identification information of a speaker. In some embodiments, the parameter analysis component 340 analyzes any textual data such as company logos, names, a name tag or a name plate having a name of the speaker placed on a table in front of the speaker, a name or ID of the speaker displayed in an application, e.g., a video conferencing application that is used for the call 720, or any other textual information associated with the call 720, to determine the identity of the speaker. For example, if the parameter analysis component 340 retrieves a name of the first speaker 705 from the name tag associated with the first speaker 705, the name from the name tag is used as the identification information of the first speaker 705. Continuing with the example, the parameter analysis component 340 may verify the name from the name tag before determining it as the identification information of the first speaker 705. The parameter analysis component 340 compares the name of the first speaker 705 retrieved from the name tag with the metadata 723 of the call to determine if the name matches with any of the invitees. If the name matches with any of the invitees, then the name of the first speaker 705 obtained from the name tag and/or from the metadata 723 is used as the identification information of the first speaker 705. In some embodiments, if the name does not match with any of the invitees, the name from the name tag may still be used as the identification information of the first speaker 705 (e.g., may happen in scenarios where a different speaker attends the meeting as a substitute to the invited speaker) but the measure of confidence may be lower than in a scenario where there is a match. In some embodiments, when the measure of confidence is lower than a threshold, the identification information in a format different from that of when the measure of confidence above the threshold. For example, the name can be displayed in a different font, with underline, with a question mark, as a hyperlink, which when clicked upon provides details as to why the measure of confidence is below the threshold.

After the identification information is determined, at block 1020, the parameter analysis component 340 identifies the voice segments associated with the identified speaker, e.g., first set of voice segments 736 associated with the first speaker 705. Further, the parameter analysis component 340 indicates to the identity assignment component 345 to assign the identification information of the first speaker 705, e.g., "John Doe," to the first set of voice segments 736.

As described above, the speaker identification system 105 can use one speaker-identification parameter or a combination of speaker-identification parameters in determining the identification information of a speaker.

Figure 11:
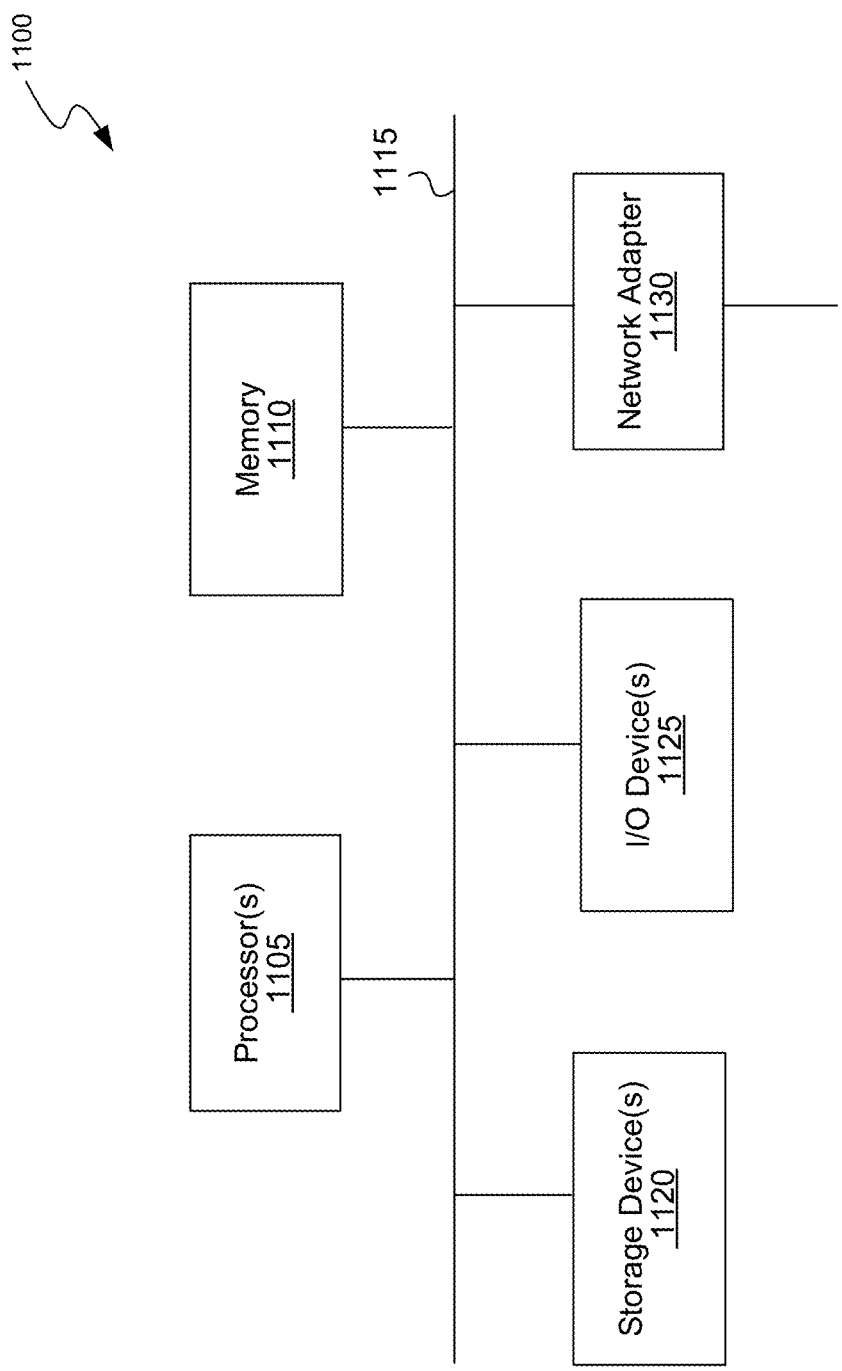
FIG. 11 is a block diagram of a processing system that can implement operations of the disclosed embodiments.

FIG. 11 is a block diagram of a computer system as may be used to implement features of the disclosed embodiments. The computing system 1100 may be used to implement any of the entities, components or services depicted in the examples of the foregoing figures (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 1110 and storage devices 1120 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method comprising:

selecting, by a computer system, to identify voices of a representative and different customers, recordings of conversations between multiple speakers, each of the conversations being between the representative and the different customers, wherein the selected recordings include voice data and metadata that provide information regarding i) the representative, ii) a first customer, and iii) a second customer, and wherein the selected recordings comprise i) a first recording of a first conversation between the representative and the first customer and ii) a second recording of a second conversation between the representative and the second customer;

generating, by the computer system, multiple sets of voice segments from the selected recordings by:

applying a statistical function to the selected recordings to mitigate background noise, removing portions of the selected recordings that do not include any voices so as to create the voice segments, and clustering the voice segments into the multiple sets, the clustering based at least in part on the voice segments having similar features, wherein each set includes one or more voice segments corresponding to one of the multiple speakers, and wherein each voice segment corresponds to a portion of the selected recordings that includes a voice of one of the multiple speakers, a first voice segment including the voice of the representative in the first conversation with the first customer and a second voice segment including the voice of the representative in the second conversation with the second customer;

identifying, by the computer system, a given set of voice segments associated with a given speaker of the multiple speakers;

determining, by the computer system, a first speaker-identification parameter by establishing, based on the voice data associated with the given set of voice segments, a vocal characteristic of the given speaker, and a second speaker-identification parameter by generating, based on the voice data associated with the given set of voice segments, a language model that specifies terms and/or phrases used by the given speaker in the conversations;

determining, by the computer system, an identity of the given speaker by:

comparing the first speaker-identification parameter to a series of fingerprints to discover a matching fingerprint, wherein the matching fingerprint is representative of the vocal characteristic of the given speaker derived from a past recording of a past conversation involving the given speaker and at least one other speaker, and establishing the identity based on the matching fingerprint and the language model;

retrieving, by the computer system, identification information related to the given speaker from a network-accessible source; and assigning, by the computer system, the identification information to the given set of voice segments associated with the given speaker.

2. The method of claim 1, wherein the selected recordings further include video data, and wherein the method further comprises:

generating, using the video data, a facial image of the given speaker that serves as another speaker-identification parameter.

3. The method of claim 2, wherein determining the identity of the given speaker further includes:

retrieving, using the metadata, one or more facial images of the multiple speakers from one or more sources, comparing the facial image of the given speaker with the one or more facial images of the multiple speakers to find a matching image, and determining the identity of the given speaker based on identification information associated with the matching image.

4. The method of claim 3, wherein retrieving the one or more facial images includes:

retrieving, using an email identification (ID) or a name of the given speaker from the metadata, the one or more facial images of the multiple speakers from a social networking service.

5. The method of claim 3, wherein retrieving the one or more facial images includes:

retrieving, using an email identification (ID) or a name of the given speaker from the metadata, the one or more facial images of the multiple speakers from an employee directory of an organization.

6. The method of claim 1, wherein the selected recordings further include video data, and wherein the method further comprises:

extracting, from the video data associated with the given speaker, text data that serves as another speaker-identification parameter.

7. The method of claim 6, wherein determining the identity of the given speaker further includes:

comparing the text data with information of the multiple speakers from the metadata to find a matching speaker, and determining the identity of the given speaker based on information associated with the matching speaker.

8. The method of claim 7, wherein comparing the text data includes:

comparing the text data with contact information of the multiple speakers available from the metadata to find the matching speaker.

9. The method of claim 7, wherein comparing the text data includes:

comparing the text data with contact information of the multiple speakers available from an employee directory of an organization, or from a source external to the organization, to find the matching speaker.

10. The method of claim 1, wherein determining the identity of the given speaker further includes:

comparing the language model of the given speaker with multiple language models of a group of speakers stored at a storage system to identify a matching language model, and determining the identity of the given speaker based on identification information associated with the matching language model.

11. A non-transitory computer-readable storage medium storing instructions that are executable by a speaker identification system, the instructions comprising:

instructions for selecting, to identify voices of a representative and different customers, real-time call data of conversations between multiple speakers, each of the conversations being between the representative and the different customers, wherein the real-time call data includes audio data, video data, and metadata that provides information regarding i) the representative, ii) a first customer, and iii) a second customer, and wherein the real-time call data comprises i) first real-time call data of a first conversation between the representative and the first customer and ii) second real-time call data of a second conversation between the representative and the second customer;

instructions for generating multiple groups of voice segments from the real-time call data, wherein each group of voice segments includes one or more voice segments corresponding to a voice of one of the multiple speakers, a first voice segment including the voice of the representative in the first conversation with the first customer and a second voice segment including the voice of the representative in the second conversation with the second customer;

instructions for identifying a given group of voice segments associated with a given speaker of the multiple speakers;

instructions for determining multiple speaker-identification parameters by analyzing the audio data and the video data associated with the given group of voice segments, wherein a first speaker-identification parameter of the multiple speaker-identification parameters is representative of an audio feature to be used to identify the given speaker, and wherein a second speaker-identification parameter of the multiple speaker-identification parameters is representative of a video feature to be used to identify the given speaker;

instructions for determining an identity of the speaker by comparing the first speaker-identification parameter to data from a first information system that internal to an organization where the speaker identification system is deployed, and the second speaker-identification parameter to data from a second information system that is external to the organization but accessible to the speaker identification system via a network; and instructions for assigning identification information of the given speaker to the given group of voice segments associated with the given speaker.

12. The non-transitory computer-readable storage medium of claim 11, wherein the speakers include one or more representatives of an organization and one or more customers of the organization with who the one or more representatives are conversing.

13. The non-transitory computer-readable storage medium of claim 12, wherein the instructions for determining the multiple speaker-identification parameters include:
instructions for using the multiple groups of voice segments as one of the multiple speaker-identification parameters to identify a representative of the one or more representatives.

14. The non-transitory computer-readable storage medium of claim 13, wherein the instructions for determining the identity include:
instructions for comparing each group of voice segments with multiple fingerprints of multiple representatives of an organization stored in a data storage system to identify a matching fingerprint, and
instructions for determining a speaker associated with a group of voice segments that matched with the matching fingerprint as a representative associated with the matching fingerprint.

15. The non-transitory computer-readable storage medium of claim 14, further comprising:
instructions from identifying the group of voice segments in the real-time call data at which the representative spoke during the conversations using the matching fingerprint, and
assigning identification information associated with the representative to the group of voice segments.

16. The non-transitory computer-readable storage medium of claim 12, wherein the instructions for determining the multiple speaker-identification parameters include:
instructions for generating, using the audio data and the video data, any of a transcript of the conversations, a facial image of the given speaker, an image of a setting at which the given speaker is located, or text data extracted from the video data as the speaker-identification parameters.

17. The non-transitory computer-readable storage medium of claim 12, wherein the instructions for determining the identity include:
instructions for comparing a facial image of the given speaker obtained from the video data with one or more facial images of the multiple speakers obtained from an image source to find a matching image, and
instructions for determining the identity of the given speaker based on identification information associated with the matching image.

18. The non-transitory computer-readable storage medium of claim 11, wherein the instructions for determining the identity include:
instructions for analyzing a transcript of the conversations to determine the identity of the given speaker, the conversations including (a) the identity of the given speaker provided by one of the multiple speakers and/or (b) information that can be used to derive the identity.

19. The non-transitory computer-readable storage medium of claim 11, wherein the instructions for determining the identity include:
instructions for retrieving images of multiple settings images from one or more sources, each of the images of the settings associated with information that can be used to identify one or more of the multiple speakers,
instructions for comparing the image of the setting with the images of the settings to find a matching image, and
instructions for determining the identity of the given speaker based on information associated with the matching image.

20. The non-transitory computer-readable storage medium of claim 11, wherein the real-time call data includes an online-based video conference meeting between the multiple speakers.

21. The non-transitory computer-readable storage medium of claim 11, wherein real-time call data includes any of a virtual reality-based or augmented reality-based conversation between the multiple speakers.

22. A computer-implemented method comprising:
selecting, to identify voices of a representative and different customers, recordings of conversations between multiple speakers, each of the conversations being between the representative and the different customers, wherein the selected recordings include voice data, video data, and metadata that provide information regarding i) the representative, ii) a first customer, and iii) a second customer, and wherein the selected recordings comprise i) a first recording of a first conversation between the representative and the first customer and ii) a second recording of a second conversation between the representative and the second customer;
generating multiple voice segments by analyzing the voice data, wherein each voice segment of the multiple voice segments represents a portion of the voice data that corresponds to a single speaker;
forming multiple sets of voice segments by grouping the multiple voice segments by speaker, wherein each set of voice segments is associated with a different speaker of the multiple speakers, a first voice segment including the voice of the representative in the first conversation with the first customer and a second voice segment including the voice of the representative in the second conversation with the second customer;
generating, based on the video data, a facial image of a speaker for the purpose of establishing an identity of the speaker;
obtaining contact information for each speaker of the multiple speakers that is extracted or derived from corresponding invitations to the conversations;
retrieving, based on the contact information, at least one facial image of each speaker of the multiple speakers from a social networking service,
wherein for each speaker of the multiple speakers, the corresponding contact information is associated with a profile from which the at least facial image is retrieved;
comparing the facial image of the speaker to the facial images retrieved from the social networking service to find a matching image; and
establishing the identity of the speaker based on identification information associated with the matching image.

23. The method of claim 22, wherein the identification information is retrieved from the social networking service.

24. The method of claim 22, wherein the contact information includes an email identification (ID) or a name for each speaker of the multiple speakers.

* * * * *